US010386894B2

(12) United States Patent
Hsu

(10) Patent No.: US 10,386,894 B2
(45) Date of Patent: Aug. 20, 2019

(54) ROTATABLE COUPLING DEVICE APPLIED TO FLEXIBLE DISPLAY SCREEN

(71) Applicant: FIRST DOME CORPORATION, New Taipei (TW)

(72) Inventor: An Szu Hsu, New Taipei (TW)

(73) Assignee: First Dome Corporation, New Taipei (TW)

(*) Notice: Subject to any disclaimer, the term of this patent is extended or adjusted under 35 U.S.C. 154(b) by 302 days.

(21) Appl. No.: 15/242,895

(22) Filed: Aug. 22, 2016

(65) Prior Publication Data
US 2017/0227994 A1  Aug. 10, 2017

(30) Foreign Application Priority Data

Feb. 5, 2016  (TW) .............................. 105202150 U

(51) Int. Cl.
| | |
|---|---|
| *G06F 1/16* | (2006.01) |
| *E05D 3/06* | (2006.01) |
| *E05D 3/18* | (2006.01) |
| *E05D 11/06* | (2006.01) |

(52) U.S. Cl.
CPC ............. *G06F 1/1681* (2013.01); *E05D 3/06* (2013.01); *E05D 3/18* (2013.01); *E05D 11/06* (2013.01); *G06F 1/1616* (2013.01); *G06F 1/1652* (2013.01); *E05Y 2900/606* (2013.01); *Y10T 16/541* (2015.01)

(58) Field of Classification Search
CPC .... G06F 1/1681; G06F 1/1616; G06F 1/1652; E05D 3/06; E05D 3/18; E05D 3/122; E05D 11/06; E05Y 2900/606; Y10T 16/547; Y10T 16/541; H05K 5/0226; H04M 1/022

USPC .......... 16/354, 366; 379/433.13; 361/679.27; 455/575.3

See application file for complete search history.

(56) References Cited

U.S. PATENT DOCUMENTS

| | | | |
|---|---|---|---|
| 8,720,011 B1* | 5/2014 | Hsu ......................... | E05D 3/122 16/354 |
| 9,348,450 B1* | 5/2016 | Kim ....................... | G06F 1/1681 |
| 9,874,048 B1* | 1/2018 | Hsu ..................... | E05D 11/1028 |
| 9,874,906 B1* | 1/2018 | Hsu ........................ | G06F 1/1681 |
| 2012/0264489 A1* | 10/2012 | Choi .................... | H04M 1/0216 455/566 |
| 2014/0196254 A1* | 7/2014 | Song ......................... | E05D 3/14 16/302 |

(Continued)

*Primary Examiner* — William L Miller
(74) *Attorney, Agent, or Firm* — Rosenberg, Klein & Lee

(57) ABSTRACT

A rotatable coupling device applied to flexible display screen includes two folding sections, a hinge disposed between the two folding sections and at least one responsive structure, which is connected with the folding sections. When the folding sections are unfolded/folded around the hinge, the responsive structure is unfolded/folded along with the folding sections. The folding sections and the responsive structure are relatively displaceable so that during the unfolding/folding process, the transmission of the deformation amount on inner and outer faces caused by the bending of the hinge can be interrupted. Therefore, the deformation amount is prevented from being further transmitted from the responsive structure outward. When the flexible display screen is coupled with the responsive structure, the responsive structure is able to absorb the deformation amount so as to eliminate the pulling or compression effect on the flexible display screen due to the deformation amount.

17 Claims, 8 Drawing Sheets

(56) References Cited

U.S. PATENT DOCUMENTS

2016/0048174 A1* 2/2016 Hsu ................. G06F 1/1681
                                                    16/342
2016/0370828 A1* 12/2016 Hsu ................. G06F 1/1681
2016/0370829 A1* 12/2016 Hsu ................. G06F 1/1681

* cited by examiner

ROTATABLE COUPLING DEVICE APPLIED TO FLEXIBLE DISPLAY SCREEN

BACKGROUND OF THE INVENTION

1. Field of the Invention

The present invention relates generally to a rotatable coupling device applied to flexible display screen, and more particularly to a coupling device assembled on an electronic apparatus with a flexible unfoldable/foldable display screen. The coupling device includes a hinge composed of multiple rotary shafts and a responsive structure assembled with the hinge. When the flexible display screen is unfolded/folded along with the hinge, the responsive structure is displaceable relative to the hinge to absorb the deformation amount on inner and outer sides caused by the hinge so as to eliminate the affection of the deformation amount on the flexible display screen.

2. Description of the Related Art

There are various electronic apparatuses provided with covers or display screens, such as mobile phones, notebooks, PDA, digital image capturing devices and electronic books. The covers, display screens or viewers are pivotally mounted on the electronic apparatuses via hinges or rotary shafts, whereby the covers, the display screens or the viewers can be freely rotated and opened/closed under external force. In order to operate the display screen (such as the screen) and/or the apparatus body of the electronic apparatus in more operation modes and application ranges, a conventional dual-shaft mechanism mounted between the display screen and the apparatus body has been developed to rotate the display screen and/or the apparatus body by different angles in accordance with different operation modes.

In recent years, there is a trend to enlarge the size of the display screen, while miniaturizing the volume of the electronic apparatus. In order to meet the harsh requirement, the manufacturers have gradually developed one-piece flexible display to fully cover the two folding leaves of the foldable/unfoldable electronic apparatus. Under such circumstance, in an unfolded state, a large-area display screen can be provided for a user. In the development process, it is found that the conventional hinge (or rotary shaft) cannot be applied to the product of the flexible display screen. This is because in the case that the flexible display screen is assembled and bridged between the two folding leaves of the conventional hinge, the hinge is positioned on one face (inner face or outer face) of the flexible display screen near the middle thereof. When the hinge is pivotally rotated and unfolded/folded, the folding face on the outer side and inner side of the rotational center of the hinge will be inevitably extended or contracted due to the difference between the rotational radiuses. Therefore, when the flexible display screen is disposed on the folding face on the outer side or the inner side of the rotational center of the hinge, which is slightly spaced from the rotational center by a gap, the extension/contraction of the folding face on the outer side and inner side due to the pivotal rotation of the hinge is indirect proportion to the distance between the folding face on the outer side and inner side and the center of the hinge. Also, the extension/contraction of the folding face on the inner side is just reverse to the extension/contraction of the folding face on the outer side. Therefore, in the condition that the flexible display screen is fixed on the inner side or the outer side of the hinge, the deformation amount caused by the extension/contraction of the folding face will inevitably lead to extension or compression of the flexible display screen. This must be overcome. Otherwise, the flexible display screen is inadaptable to the extension/contraction requirement in the unfolding/folding operation and can be hardly applied to such product. Therefore, it is a critical issue how to avoid the extension or the compression of the flexible display screen, which is caused when the conventional hinge is unfolded/folded. This technique decides whether the flexible display screen can be widely applied to the unfoldable/foldable electronic apparatus.

It is therefore tried by the applicant to provide a rotatable coupling device applied to flexible display screen to improve the shortcoming of the conventional technique.

SUMMARY OF THE INVENTION

It is therefore a primary object of the present invention to provide a rotatable coupling device applied to flexible display screen. The rotatable coupling device is disposed on an electronic apparatus with a flexible display screen. The rotatable coupling device includes a hinge and a responsive structure assembled with the hinge. When the hinge is unfolded/folded, the responsive structure is able to absorb the deformation amount of the folding faces of the inner and outer sides caused by the hinge. Therefore, the direct affection of the deformation amount on the flexible display screen is eliminated and the possibility of damage of the flexible display screen due to the deformation amount is minimized. In this case, the flexible display screen is applicable to the electronic apparatus with a flexible display screen to widen the application range of the flexible display screen.

To achieve the above and other objects, the rotatable coupling device applied to flexible display screen of the present invention includes two folding sections, a hinge disposed between the two folding sections and at least one responsive structure. The responsive structure includes a displaceable section and a non-displaceable section. The non-displaceable section is assembled with the displaceable section. The displaceable section is displaceable toward or away from the non-displaceable section. The displaceable section is fixedly connected on the folding sections. The flexible display screen is coupled to the non-displaceable section of the responsive structure. Accordingly, when the hinge is pivotally rotated, the responsive structure can absorb the deformation amount of the folding face caused by the hinge so as to eliminate the ill affection of the deformation amount on the flexible display screen.

According to the above arrangement, when the folding sections are folded or unfolded around the hinge as a rotational center, the displaceable section of the responsive structure is displaced relative to the non-displaceable section. Therefore, the responsive structure is displaced relative to the folding sections. In this case, the responsive structure is not only folded or unfolded along with the folding sections, but also is able to absorb the folding deformation amount caused when the hinge is folded so as to prevent the deformation amount from being transmitted through the responsive structure to affect the flexible display screen coupled to the responsive structure. Accordingly, it is ensured that the flexible display screen is free from the pulling or compression effect due to the deformation amount.

According to the above arrangement, the rotatable coupling device is characterized in that the responsive structure includes a displaceable section and a non-displaceable section. The displaceable section is fixedly connected with the folding sections and the non-displaceable section is relatively movably assembled with the displaceable section. The flexible display screen is coupled on the non-displaceable section, whereby the displaceable section and the non-displaceable section can slide relative to each other to extend or retract so as to absorb the deformation amount.

In the above rotatable coupling device, the non-displaceable section includes a folding slide cover and a folding slide seat and the displaceable section includes at least one folding slide plate. The folding slide plate is relatively movably disposed between the folding slide cover and the folding slide seat. The flexible display screen is disposed on the folding slide seat.

In the above rotatable coupling device, a flexible plate is additionally fixedly disposed between the folding slide seats on two sides of the hinge. When the flexible display screen is attached to the folding sections and the hinge, the flexible plate serves to provide necessary support and separation for the flexible display screen. When the folding sections are folded/unfolded around the hinge, the flexible plate also provides a restriction effect to restrict the total length of the non-displaceable sections on two sides within a range. Accordingly, the flexible display screen can be smoothly folded/unfolded and bent/straightened along with the flexible plate.

In the above rotatable coupling device, an elastic member is supported and disposed between the non-displaceable section and the displaceable section, whereby in normal state, the non-displaceable section and the displaceable section are elastically forced and extended away from each other. In design, the folding slide plate is formed with latch holes on an edge proximal to the folding section for coupling with the folding section. The folding slide plate is formed with restriction sections directed to the folding slide cover and the folding slide seat. The elastic member is supported and disposed between the non-displaceable section and the restriction sections of the folding slide plate. Accordingly, the elastic members respectively elastically drive the non-displaceable sections, whereby the non-displaceable sections tend to displace away from the hinge. Therefore, in normal state, two ends of the flexible plate are respectively pulled toward two lateral sides. Under such circumstance, the flexible plate and the surface of the flexible display screen are naturally tensioned in a plane state.

In the above rotatable coupling device, the folding slide plate is formed with at least one guided section. The guided section of the folding slide plate extends in a direction of relative displacement between the responsive structure and the hinge. The non-displaceable section or the folding slide cover has at least one guide section. The guide section of the folding slide cover serves to guide the guided section of the folding slide plate to relatively displace.

In the above rotatable coupling device, a subsidiary folding slide plate is fixedly laminated on at least one of two faces of the folding slide plate of the displaceable section, whereby a part of the folding section is sandwiched between the subsidiary folding slide plates. The subsidiary folding slide plate is formed with at least one subsidiary guided section corresponding to the guided section. The subsidiary guided section of the subsidiary folding slide plate also extends in a direction of the relative displacement between the responsive structure and the hinge. The subsidiary guided section of the subsidiary folding slide plate is guided by the guide section. The subsidiary folding slide plate is formed with insertion shield recesses on an edge adjacent to the folding section. The insertion shield recesses serve to insert and assemble with the folding section to achieve a shielding effect. The folding slide plate and the subsidiary folding slide plate are formed with notches directed to the folding slide cover and the folding slide seat as the restriction sections. An elastic member is formed with a first end and a second end. First and second end of the elastic member are respectively supported and disposed between the non-displaceable section and the restriction sections. The guided section and the subsidiary guided section are travel slots relatively displaceable away from or toward the hinge. The guide section is a slide block fixed on the non-displaceable section and disposed in the travel slots. Alternatively, the guided section and the subsidiary guided section are slide rails and the guide section is a slide sleeve slidably fitted on the slide rails. Accordingly, the guide section and the guided section and the subsidiary guided section are relatively slidably assembled with each other, whereby the folding slide seat and the folding slide cover and the folding slide plate and the subsidiary folding slide plate can be displaced relative to each other to provide deformation amount absorption function.

In the above rotatable coupling device, the hinge includes multiple rotary shafts for the folding sections on two sides to synchronously or asynchronously fold/unfold.

The present invention can be best understood through the following description and accompanying drawings, wherein:

DETAILED DESCRIPTION OF THE PREFERRED EMBODIMENTS

Figure 1:
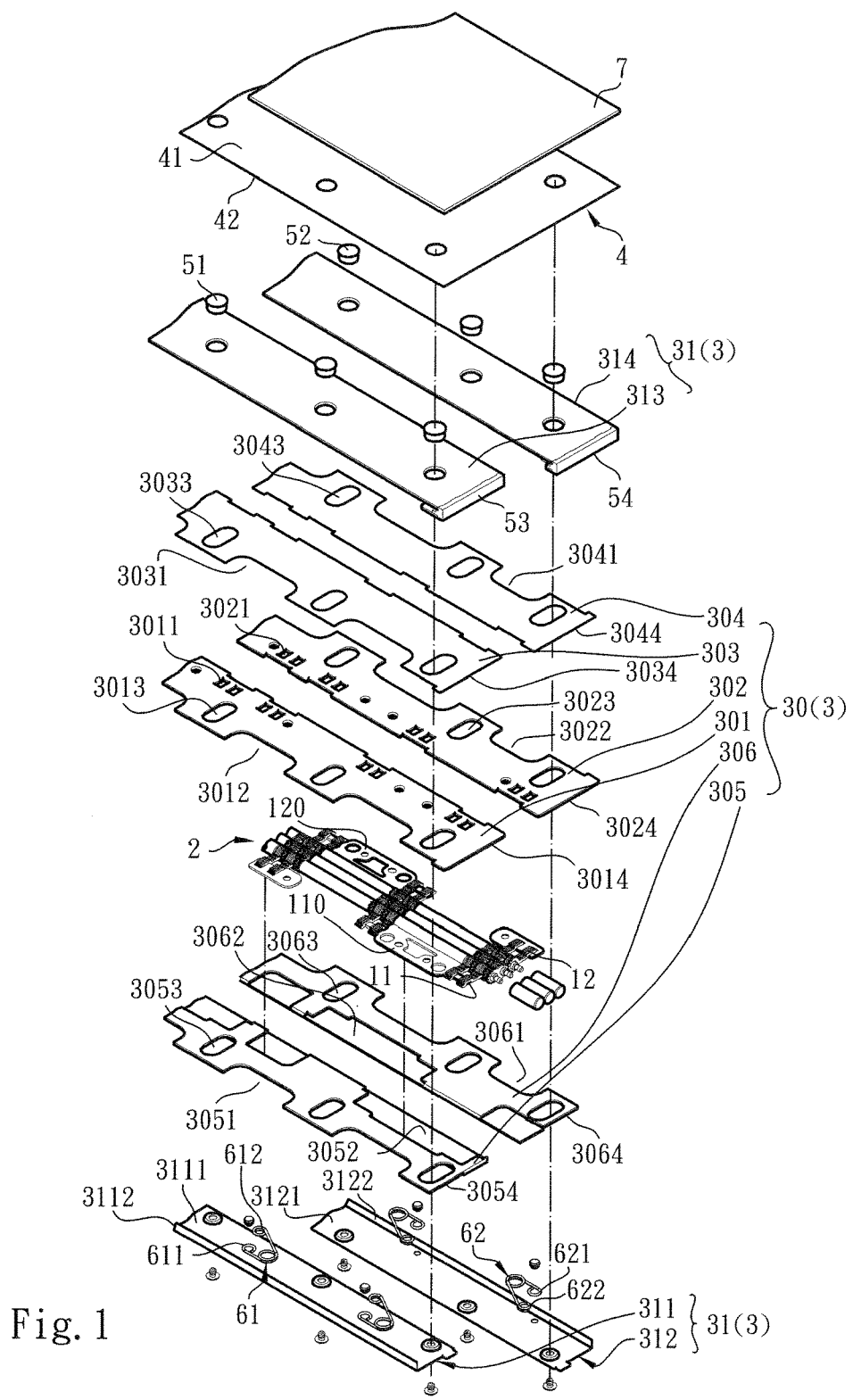
FIG. 1 is a perspective exploded view of the present invention.
Figure 2:
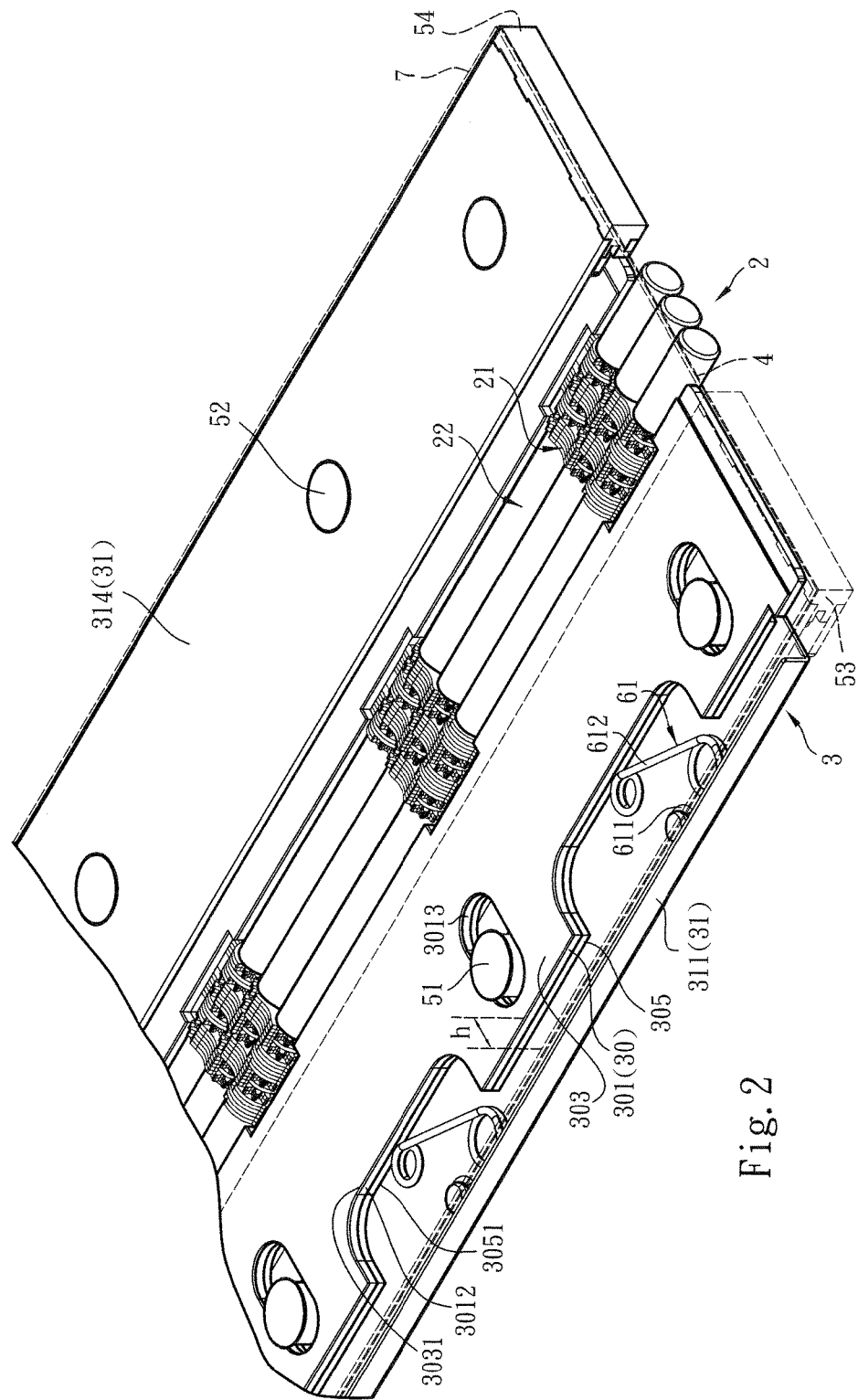
FIG. 2 is a partially perspective assembled view of the present invention according to FIG. 1.
Figure 3:
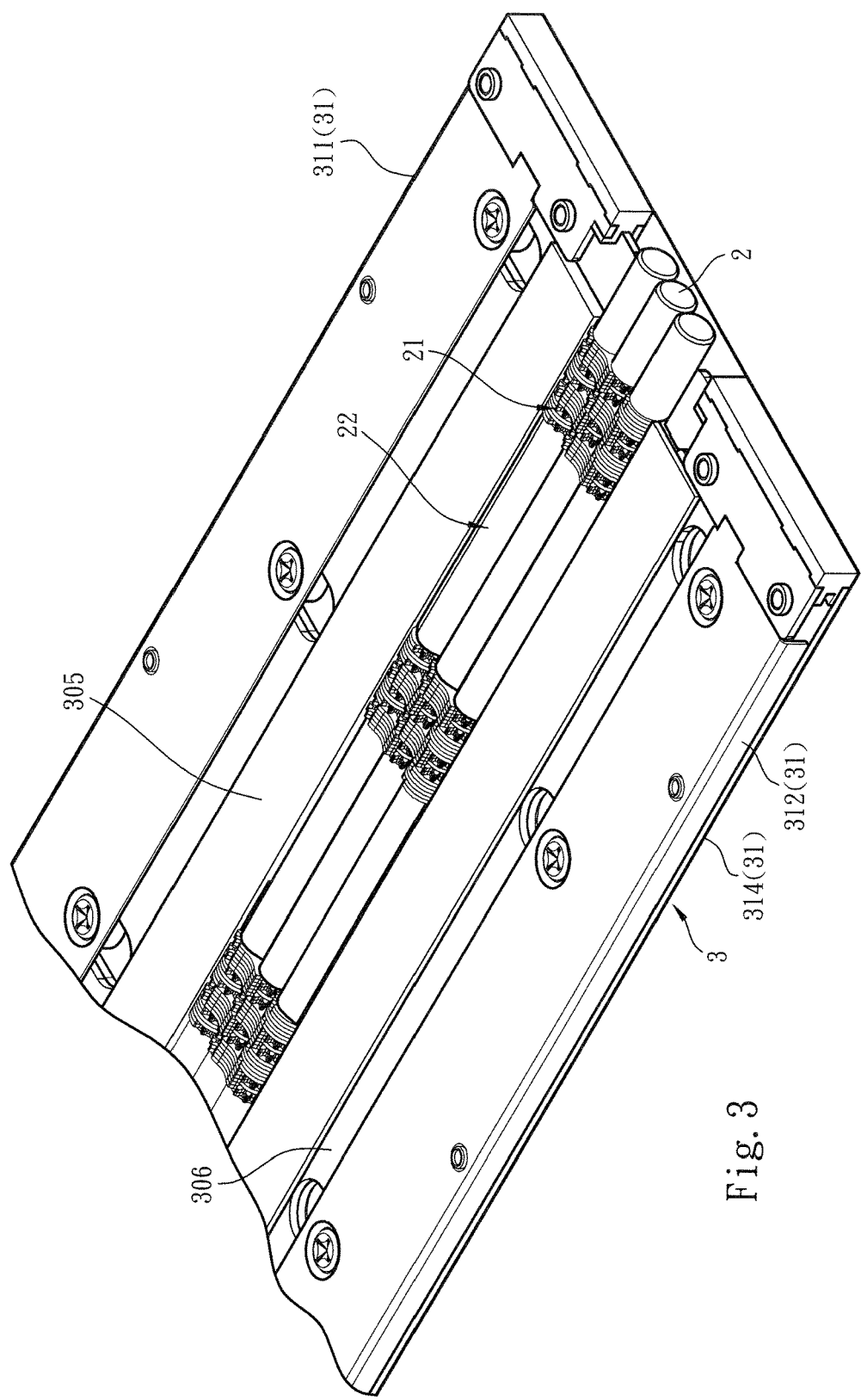
FIG. 3 is a rear perspective view according to FIG. 2.
Figure 4:
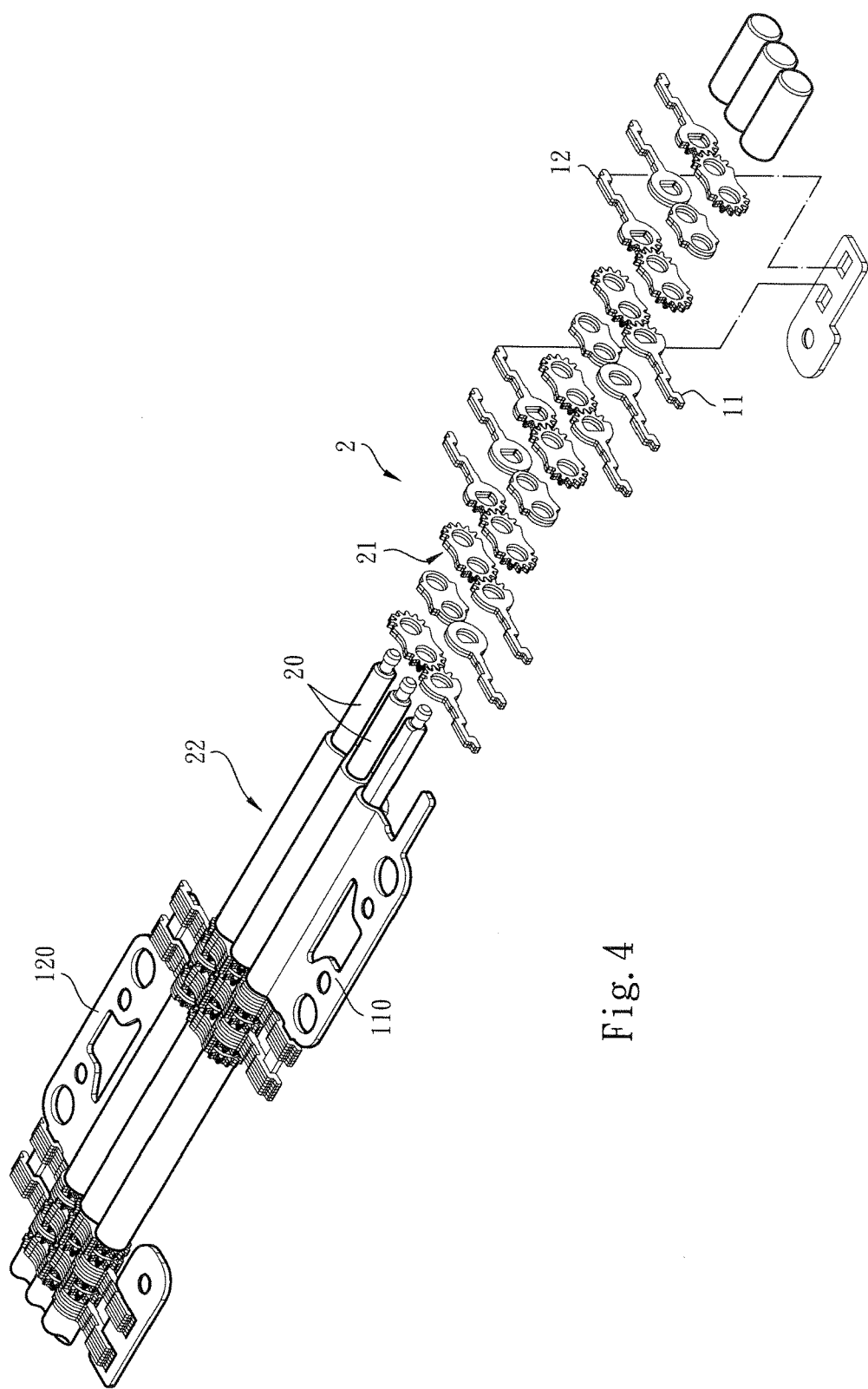
FIG. 4 is a perspective exploded view of the hinge of the present invention according to FIG. 2.

Please refer to FIGS. 1 to 4. The rotatable coupling device applied to flexible display screen of the present invention includes two folding sections 11, 12, a hinge 2 disposed between the two folding sections 11, 12 and at least one responsive structure 3. The hinge 2 includes multiple rotary shafts 20 as a dual-shaft mechanism or a multi-shaft mechanism. The rotary shafts 20 are arranged in parallel to each other for the folding sections 11, 12 on two sides to synchronously or asynchronously fold/unfold. The rotary shafts 20 are movably interconnected by means of gears or other linking structures 21 and/or sleeve structures 22. The two folding sections 11, 12, 110, 120 respectively extend from two sides of the linking structures 21 or two sides of the sleeve structures 22. The responsive structure 3 is coupled to the folding sections 11, 12, 110, 120 on at least one side.

Figure 5:
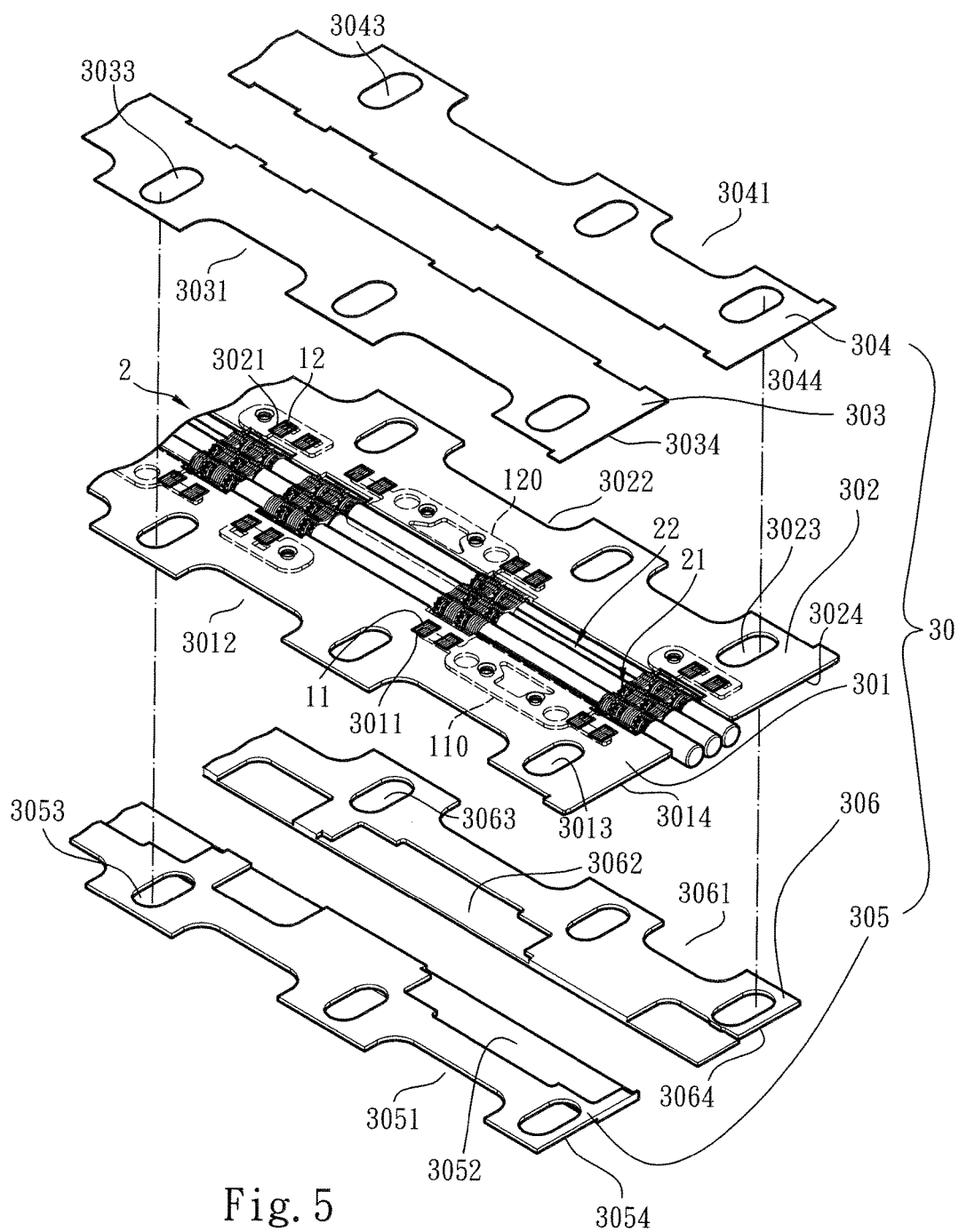
FIG. 5 is a perspective exploded view of the hinge, the folding slide plate and the subsidiary folding slide plate of the present invention according to FIG. 1.
Figure 6:
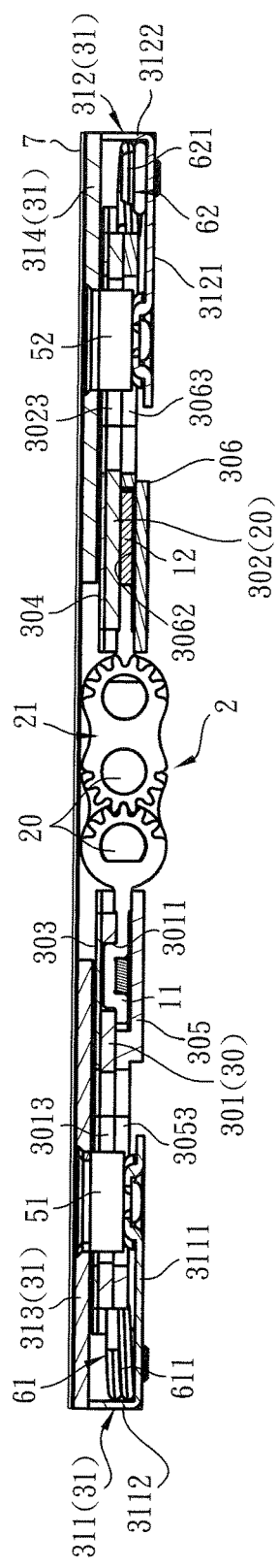
FIG. 6 is a sectional view according to FIG. 2.

As shown in FIGS. 1, 5 and 6, in a preferred embodiment, the responsive structure 3 has a displaceable section 30. The displaceable section 30 is connected on at least one of the folding sections 11, 12, 110, 120 and is relatively displaceable toward or away from the hinge 2 and the folding sections 11, 12, 110, 120. Accordingly, the displaceable section 30 is securely and synchronously movably connected on the folding sections 11, 12, 110, 120. In addition, the responsive structure 3 further has a non-displaceable section 31. The non-displaceable section 31 is relatively movably assembled with the displaceable section 30. The non-displaceable section 31 is for assembling with a flexible display screen 7. The non-displaceable section 31 of the responsive structure 3 includes at least one folding slide cover 311, 312 and at least one folding slide seat 313, 314. The displaceable section 30 includes folding slide plates 301, 302. The folding sections 11, 12, 110, 120 on two sides of the hinge 2 are respectively connected with the folding slide plates 301, 302. The folding slide plates 301, 302 are relatively movably disposed between the folding slide covers 311, 312 and the folding slide seats 313, 314.

Figure 7:
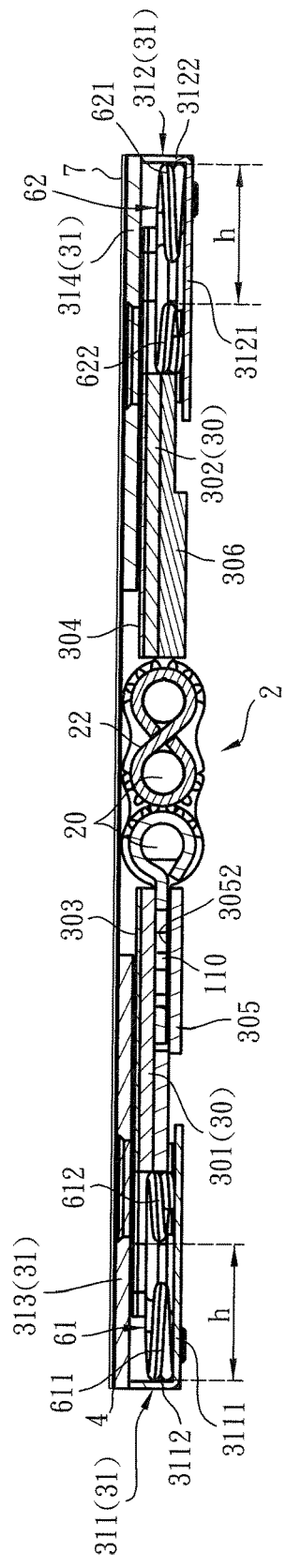
FIG. 7 is another sectional view according to FIG. 2.

To speak more specifically, the folding sections 11, 110 on one side of the hinge 2 (as shown in FIGS. 5 to 7) are coupled to the folding slide plate 301 of the displaceable section 30. The folding slide plate 301 is disposed between the folding sections 11, 110 and the non-displaceable section 31 (the folding slide cover 311 and the folding slide seat 313). The folding sections 12, 120 on the other side of the hinge 2 are coupled to the folding slide plate 302 of the displaceable section 30. The folding slide plate 302 is disposed between the folding sections 12, 120 and the non-displaceable section 31 (the folding slide cover 312 and the folding slide seat 314). As shown in FIGS. 1 and 5, the folding slide plate 301 is formed with multiple latch holes 3011 on an edge proximal to the folding sections 11, 110 for coupling with the folding section 11. The folding slide plate 301 is formed with multiple restriction sections 3012 on an edge directed to the folding slide cover 311 and the folding slide seat 313. The folding slide plate 301 is formed with multiple notches open to the folding slide cover 311 and the folding slide seat 313 as the restriction sections 3012. The folding slide plate 302 is formed with multiple latch holes 3021 on an edge proximal to the folding sections 12, 120 for coupling with the folding section 12. The folding slide plate 302 is formed with multiple restriction sections 3022 on an edge directed to the folding slide cover 312 and the folding slide seat 314. The folding slide plate 302 is formed with multiple notches open to the folding slide cover 312 and the folding slide seat 314 as the restriction sections 3022.

It should be noted that a subsidiary folding slide plate 303, 305 (as shown in FIGS. 1 and 5) can be fixedly laminated on at least one of the upper and lower faces of the folding slide plate 301 of the displaceable section 30. Accordingly, a part of the folding section 11, 110 on one side of the hinge 2 is sandwiched between the subsidiary folding slide plates 303, 305. Under such circumstance, the folding slide plate 301 and the subsidiary folding slide plate 303, 305 are relatively movably disposed between the folding slide cover 311 and the folding slide seat 313. The subsidiary folding slide plate 303, 305 are formed with multiple notches on an edge directed to the folding slide cover 311 and the folding slide seat 313. The notches are open to the folding slide cover 311 and the folding slide seat 313 as the restriction sections 3031, 3051 of the subsidiary folding slide plate 303, 305. The subsidiary folding slide plate 305 is formed with multiple insertion shield recesses 3052 on an edge directed to the folding section 11, 110. The insertion shield recesses 3052 serve to insert and assemble with the rear end of the folding section 110 to achieve a shielding effect. Accordingly, by means of the insertion shield recesses 3052, the subsidiary folding slide plate 305 is coupled to the rear end of the folding section 110. A subsidiary folding slide plate 304, 306 can be also fixedly laminated on at least one of the upper and lower faces of the folding slide plate 302 of the displaceable section 30. Accordingly, a part of the folding section 12, 120 on the other side of the hinge 2 is sandwiched between the subsidiary folding slide plates 304, 306. Under such circumstance, the folding slide plate 302 and the subsidiary folding slide plate 304, 306 are relatively movably disposed between the folding slide cover 312 and the folding slide seat 314. The subsidiary folding slide plate 304, 306 are formed with multiple notches on an edge directed to the folding slide cover 312 and the folding slide seat 314. The notches are open to the folding slide cover 312 and the folding slide seat 314 as the restriction sections 3041, 3061 of the subsidiary folding slide plate 304, 306. The subsidiary folding slide plate 306 is formed with multiple insertion shield recesses 3062 on an edge directed to the folding section 12, 120. The insertion shield recesses 3062 serve to insert and assemble with the rear end of the folding section 120 to achieve a shielding effect. Accordingly, by means of the insertion shield recesses 3062, the subsidiary folding slide plate 306 is coupled to the rear end of the folding section 120.

Please refer to FIGS. 1, 6 and 7. The folding slide cover 311 has a substrate 3111. The folding slide plate 301 is slidably disposed on the surface of the substrate 3111. A wall section 3112 is disposed on the surface of the substrate 3111 and directed to the folding slide plate 301. An unfolding/retraction gap h is defined between the wall section 3112 and the edge of the folding slide plate 301. An elastic member 61 is supported and disposed between the folding slide cover 311 and the folding slide plate 301. The elastic member 61 can be a torque spring having a first end 611 and a second end 612. The first end 611 of the elastic member 61 is fixedly pivotally disposed on the surface of the substrate 3111 of the folding slide cover 311 and leant against the wall section 3112. The second end 612 of the elastic member 61 is a free end. The free end is elastically supported and disposed on the restriction sections 3012, 3031, 3051 of the folding slide plate 301 and the subsidiary folding slide plates 303, 305. Accordingly, in normal state, the non-displaceable section 31 (the folding slide cover 311 and the folding slide seat 313) and the displaceable section 30 (the folding slide plate 301 and the subsidiary folding slide plates 303, 305) are elastically forced and extended away from each other. Alternatively, the first end 611 of the elastic member 61 is fixedly pivotally disposed on the folding slide plate 301 and the subsidiary folding slide plates 303, 305 and the second end 612 is elastically supported and disposed on the folding slide cover 311. The folding slide cover 312 has a substrate 3121. The folding slide plate 302 is slidably disposed on the substrate 3121. A wall section 3122 is disposed on the surface of the substrate 3121 and directed to the folding slide plate 302. An unfolding/retraction gap h is defined between the wall section 3122 and the edge of the folding slide plate 302. An elastic member 62 is supported and disposed between the folding slide cover 312 and the folding slide plate 302. The elastic member 62 can be a torque spring having a first end 621 and a second end 622. The first end 621 of the elastic member 62 is fixedly pivotally disposed on the surface of the substrate 3121 of the folding slide cover 312 and leant against the wall section 3122. The second end 622 of the elastic member 62 is a free end. The free end is elastically supported and disposed on the restriction sections 3022, 3041, 3061 of the folding slide plate 302 and the subsidiary folding slide plates 304, 306. Accordingly, in normal state, the non-displaceable section 31 (the folding slide cover 312 and the folding slide seat 314) and the displaceable section 30 (the folding slide plate 302 and the subsidiary folding slide plates 304, 306) are elastically forced and extended away from each other. Alternatively, the first end 621 of the elastic member 62 is fixedly pivotally disposed on the folding slide plate 302 and the subsidiary folding slide plates 304, 306 and the second end 622 is elastically supported and disposed on the folding slide cover 312.

As shown in FIGS. 1, 6 and 7, a flexible plate 4 is bridged between the non-displaceable sections 31 on two sides of the hinge 2. The non-displaceable sections 31 are assembled with the flexible display screen 7 via the flexible plate 4. The flexible plate 4 can be a flexible thin steel sheet having an outer surface 41 and an inner surface 42. The flexible plate 4 is disposed between the flexible display screen 7 and the folding slide seats 313, 314. Two ends of the inner surface 42 of the flexible plate 4 are respectively connected on the folding slide seats 313, 314. The flexible display screen 7 is fixed on the outer surface 41 of the flexible plate 4. Accordingly, two ends of the flexible display screen 7 are connected on the folding slide seats 313, 314 via the flexible plate 4. In cooperation with the unfolding/retraction effect between the non-displaceable section 31 and the displaceable section 30, the flexible plate 4 is slidably attached to the folding sections 11, 12, 110, 120 and the hinge 2. Therefore, the flexible plate 4 can provide a support for the flexible display screen 7 attached to the folding sections 11, 12, 110, 120 and the hinge 2 and separate the flexible display screen 7 therefrom as necessary.

In a preferred embodiment, the folding slide plate 301 is formed with at least one guided section 3013. The subsidiary folding slide plates 303, 305 are formed with at least one subsidiary guided section 3033, 3053 corresponding to the guided section 3013. The folding slide plate 302 is formed with at least one guided section 3023. The subsidiary folding slide plates 304, 306 are formed with at least one subsidiary guided section 3043, 3063 corresponding to the guided section 3023. Two ends of the guided sections 3013, 3023 and the subsidiary guided sections 3033, 3043, 3053, 3063 respectively extend in a direction of the relative displacement between the responsive structure and the hinge 2. At least one guide section 51 is fixedly disposed between the substrate 3111 of the folding slide cover 311 and the folding slide seat 313. The guide section 51 of the folding slide cover 311 and the folding slide seat 313 serves to guide the guided section 3013 of the folding slide plate 301 and the subsidiary guided sections 3033, 3053 of the subsidiary folding slide plates 303, 305 to relatively displace. At least one guide section 52 is fixedly disposed between the substrate 3121 of the folding slide cover 312 and the folding slide seat 314. The guide section 52 of the folding slide cover 312 and the folding slide seat 314 serves to guide the guided section 3023 of the folding slide plate 302 and the subsidiary guided sections 3043, 3063 of the subsidiary folding slide plates 304, 306 to relatively displace. The flexible plate 4 is fixed on the folding slide seats 313, 314 by means of the guide sections 51, 52. To speak more specifically, the guided sections 3013, 3023 and the subsidiary guided sections 3033, 3043, 3053, 3063 can be travel slots. The guide sections 51, 52 can be slide blocks slidably disposed in the travel slots. Alternatively, the guided sections 3014, 3024 and the subsidiary guided sections 3034, 3044, 3054, 3064 can be slide rails disposed on two sides of the folding slide plates 301, 302 and the subsidiary folding slide plates 303, 304, 305, 306. The guide sections 53, 54 can be slide sleeves arranged on two sides of the folding slide covers 311, 312 and the folding slide seats 313, 314. The slide sleeves are fitted on the slide rails. Accordingly, via the guide sections 51, 53, the folding slide cover 311 and the folding slide seat 313 can be slidably assembled with the guided sections 3013, 3014 of the folding slide plate 301 and the subsidiary guided sections 3033, 3053, 3034, 3054 of the subsidiary folding slide plates 303, 305. Via the guide sections 52, 54, the folding slide cover 312 and the folding slide seat 314 can be slidably assembled with the guided sections 3023, 3024 of the folding slide plate 302 and the subsidiary guided sections 3043, 3063, 3044, 3064 of the subsidiary folding slide plates 304, 306.

As shown in FIGS. 1, 6 and 7, the flexible plate 4 is connected between the folding slide seats 313, 314, whereby the flexible plate 4 is connected on the folding sections 11, 12, 110, 120 and the hinge 2 and relatively displaceable toward or away from the hinge 2. Accordingly, the flexible display screen 7 is slidably supported and attached to the folding sections 11, 12, 110, 120 and the hinge 2. Also, the elastic members 61, 62 respectively elastically drive the folding slide seats 313, 314, whereby the folding slide seats 313, 314 tend to displace away from the hinge 2. Therefore, in normal state, two ends of the flexible plate 4 are respectively pulled toward two lateral sides. Under such circumstance, the flexible plate 4 and the surface of the flexible display screen 7 are naturally tensioned in a plane state.

Figure 8:
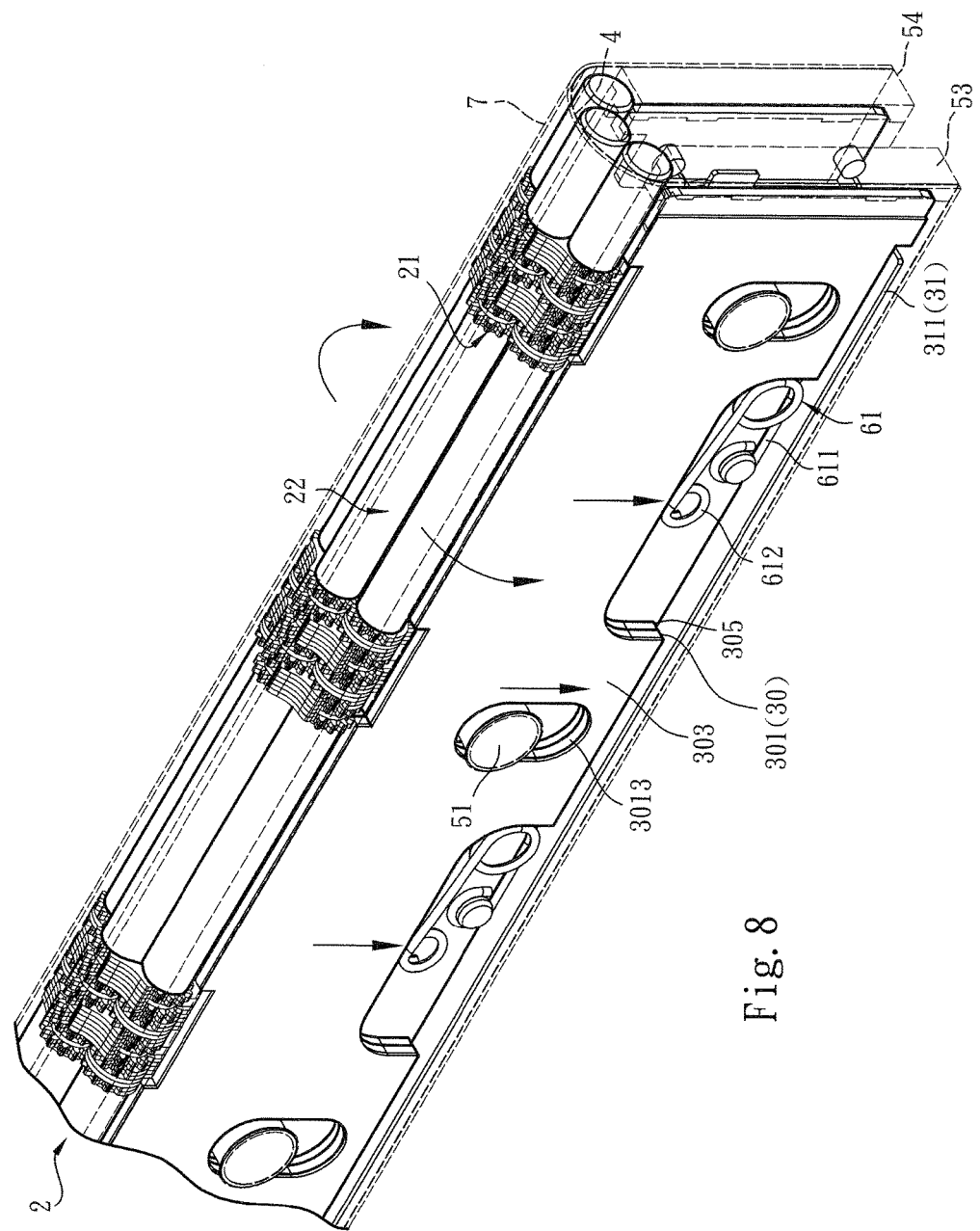
FIG. 8 is a perspective view according to FIG. 2, showing the use of the present invention.
Figure 9:
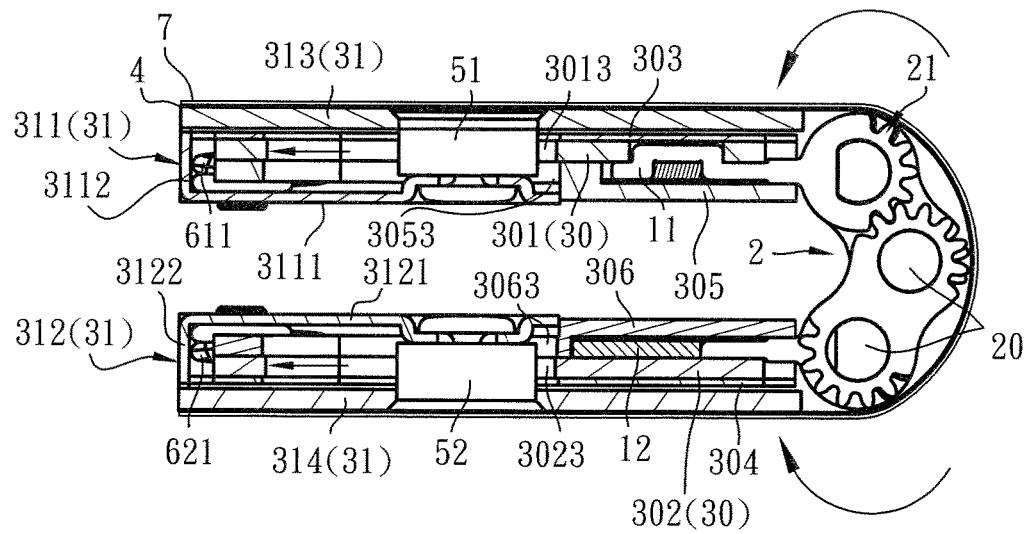
FIG. 9 is a sectional view according to FIG. 8.
Figure 10:
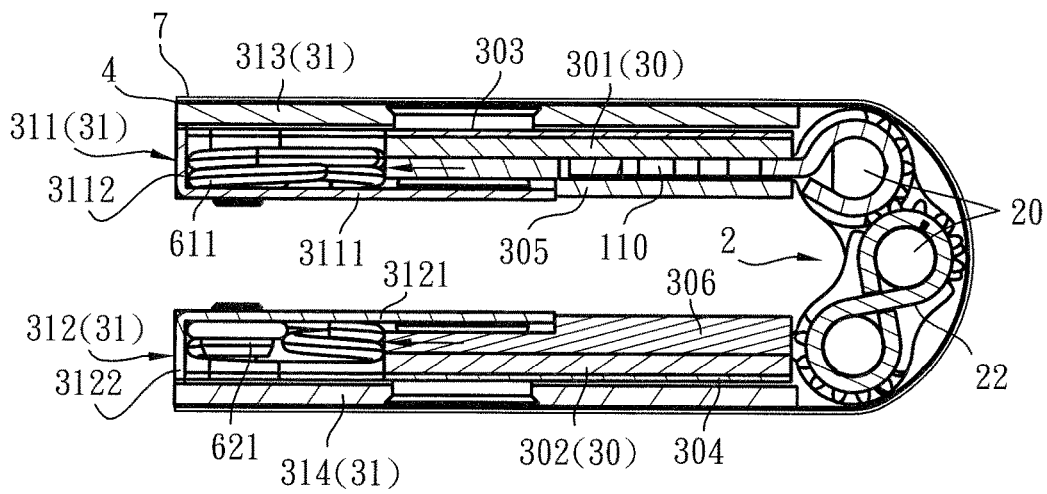
FIG. 10 is another sectional view according to FIG. 8.

Please refer to FIGS. 8 to 10. When the folding sections 11, 110, the folding slide plate 301 and the subsidiary folding slide plates 303, 305, and the folding sections 12, 120, the folding slide plate 302 and the subsidiary folding slide plates 304, 306 are respectively folded or unfolded around the rotational center of the hinge 2 as an axis, one end of the flexible plate 4 is driven by the folding slide plate 301 via the folding slide seat 313, while the other end of the flexible plate 4 is driven by the folding slide plate 302 via the folding slide seat 314. At the same time, during the process of pivotal rotation, the hinge 2 is deformed to urge the folding sections 11, 110 and the folding slide plate 301 to relatively displace and slide/extend toward the folding slide cover 311 and the folding slide seat 313, and also urge the folding sections 12, 120 and the folding slide plate 302 to relatively displace and slide/extend toward the folding slide cover 312 and the folding slide seat 314. Accordingly, the responsive structure 3 will displace relative to the hinge 2 to absorb the folding face deformation amount caused during the process of pivotal rotation of the hinge 2. Therefore, the ill affection of the deformation amount on the flexible display screen 7 can be eliminated. During the bending/folding process, by means of the cooperation between the flexible plate 4 and the hinge structure 2 of the multi-shaft mechanism 20, the bending arc position of the hinge 2 can be bent and changed to a gentler extent to provide secure support for the flexible display screen 7. This can prevent the flexible display screen 7 from being bent and damaged due to severe bending/changing extent between the folding sections 11, 12, 110, 120.

According to the above arrangement, the flexible display screen 7 is attached to the folding sections 11, 12, 110, 120 and the hinge 2 and folded/unfolded along therewith. In this case, the bending deformation amount caused by the bending of the hinge 2 can be released by means of the relative displacement between the displaceable section 30 and the non-displaceable section 31. Accordingly, the deformation amount of the hinge 2 will not pass through the responsive structure 3 to affect the flexible display screen 7 coupled with the responsive structure 3. In this case, it is ensured that the flexible display screen 7 will not be affected by the pull or compression effect of the deformation amount.

In a modified embodiment, the flexible plate 4 is omitted and two ends of the flexible display screen 7 are directly fixed on the folding slide seats 313, 314.

The above embodiments are only used to illustrate the present invention, not intended to limit the scope thereof. Many modifications of the above embodiments can be made without departing from the spirit of the present invention.

What is claimed is:

1. A rotatable coupling device applied to a flexible display screen, comprising two folding sections, a hinge disposed between the two folding sections and two responsive structures, each of the responsive structures include a displaceable section and a non-displaceable section relatively movably assembled with each other, the displaceable section being connected on a respective one of the folding sections, and a flexible plate bridged between the non-displaceable sections on two sides of the hinge, each of the responsive structures being relatively displaceable toward or away from the hinge, the folding sections being unfoldable/foldable around a rotational center of the hinge as an axis, the responsive structures being unfoldable/foldable along with the folding sections, whereby the responsive structures are displaceable relative to the hinge to absorb the bending deformation amount caused during the unfolding/folding of the hinge.

2. The rotatable coupling device applied to the flexible display screen as claimed in claim 1, wherein each non-displaceable section includes a folding slide cover and a folding slide seat and each displaceable section includes at least one folding slide plate, the folding slide plate being relatively movably disposed between the folding slide cover and the folding slide seat.

3. The rotatable coupling device applied to the flexible display screen as claimed in claim 2, wherein an elastic member is supported and disposed between the non-displaceable section and the displaceable section of each of the responsive structures, whereby in normal state, the non-displaceable section and the displaceable section of each of the responsive structures are elastically forced and extended away from each other.

4. The rotatable coupling device applied to the flexible display screen as claimed in claim 2, further comprising an elastic member supported and disposed between the non-displaceable section and the displaceable section of each of the responsive structures, each folding slide plate being formed with latch holes on an edge proximal to the folding section for coupling with the folding section, each folding slide plate being formed with restriction sections directed to the folding slide cover and the folding slide seat, each elastic member has having a first end and a second end, the first end of each elastic member being fixedly pivotally disposed on a corresponding non-displaceable section, the second end of each elastic member being a free end, the free end being supported and disposed on the restriction sections of a corresponding folding slide plate.

5. The rotatable coupling device applied to the flexible display screen as claimed in claim 4, wherein the first end of the elastic member that is fixedly pivotally disposed on the non-displaceable section of the folding slide cover.

6. The rotatable coupling device applied to the flexible display screen as claimed in claim 2, wherein each folding slide plate is formed with at least one guided section, the guided section of a respective folding slide plate extending in a direction of relative displacement between a corresponding responsive structure and the hinge, a corresponding non-displaceable section having at least one guide section, the guide section serving to guide the guided section of the respective folding slide plate to relatively displace.

7. The rotatable coupling device applied to the flexible display screen as claimed in claim 6, wherein a subsidiary folding slide plate is fixedly laminated on at least one of two faces of the folding slide plate of a corresponding displaceable section, whereby a part of each folding section is sandwiched between the subsidiary folding slide plates, the subsidiary folding slide plate being formed with at least one subsidiary guided section corresponding to the guided section, the subsidiary guided section of the subsidiary folding slide plate extending in a direction of the relative displacement between the responsive structure and the hinge, the subsidiary guided section of the subsidiary folding slide plate being guided by the guide section, the subsidiary folding slide plate being formed with insertion shield recesses on an edge directed to the folding section, the insertion shield recesses serving to insert and assemble with a corresponding folding section to achieve a shielding effect, each folding slide plate and a corresponding subsidiary folding slide plate being formed with notches directed to a corresponding folding slide cover and the restriction sections of a respective folding slide seat, an elastic member is formed with a first end and a second end, the first end and the second end of the elastic member being respectively supported and disposed between each non-displaceable section and a corresponding one of the restriction sections.

8. The rotatable coupling device applied to the flexible display screen as claimed in claim 7, wherein the guided section is a travel slot and the guide section is a slide block slidably disposed in the travel slot for guiding displacement of a corresponding folding slide plate.

9. The rotatable coupling device applied to the flexible display screen as claimed in claim 6, wherein the guided section is a travel slot and the guide section is a slide block slidably disposed in the travel slot for guiding displacement of a corresponding folding slide plate.

10. The rotatable coupling device applied to the flexible display screen as claimed in claim 2, wherein the hinge includes multiple rotary shafts for the two folding sections respectively on two sides of the hinge to synchronously fold/unfold.

11. The rotatable coupling device applied to the flexible display screen as claimed in claim 2, wherein the flexible display screen is coupled to the non-displaceable sections.

12. The rotatable coupling device applied to the flexible display screen as claimed in claim 1, wherein the flexible plate is a flexible thin steel sheet.

13. The rotatable coupling device applied to the flexible display screen as claimed in claim 1, wherein an elastic member is supported and disposed between the non-displaceable section and the displaceable section of each of the responsive structures, whereby in normal state, the non-displaceable section and the displaceable section of each of the responsive structures are elastically forced and extended away from each other.

14. The rotatable coupling device applied to the flexible display screen as claimed in claim 13, wherein the elastic member is formed with a first end and a second end, the first end of the elastic member is fixedly pivotally disposed on one of the non-displaceable section and the displaceable section of a respective one of the responsive structures, the second end of the elastic member being a free end, the free end being supported and disposed on the other of the non-displaceable section and the displaceable section of the respective responsive structure.

15. The rotatable coupling device applied to the flexible display screen as claimed in claim 1, wherein the hinge includes multiple rotary shafts for the two folding sections respectively on two sides of the hinge to synchronously fold/unfold.

16. The rotatable coupling device applied to the flexible display screen as claimed in claim 1, wherein the flexible display screen is coupled on the responsive structures.

17. The rotatable coupling device applied to the flexible display screen as claimed in claim 1, wherein the flexible display screen is coupled to the non-displaceable sections.

* * * * *